UNITED STATES PATENT OFFICE.

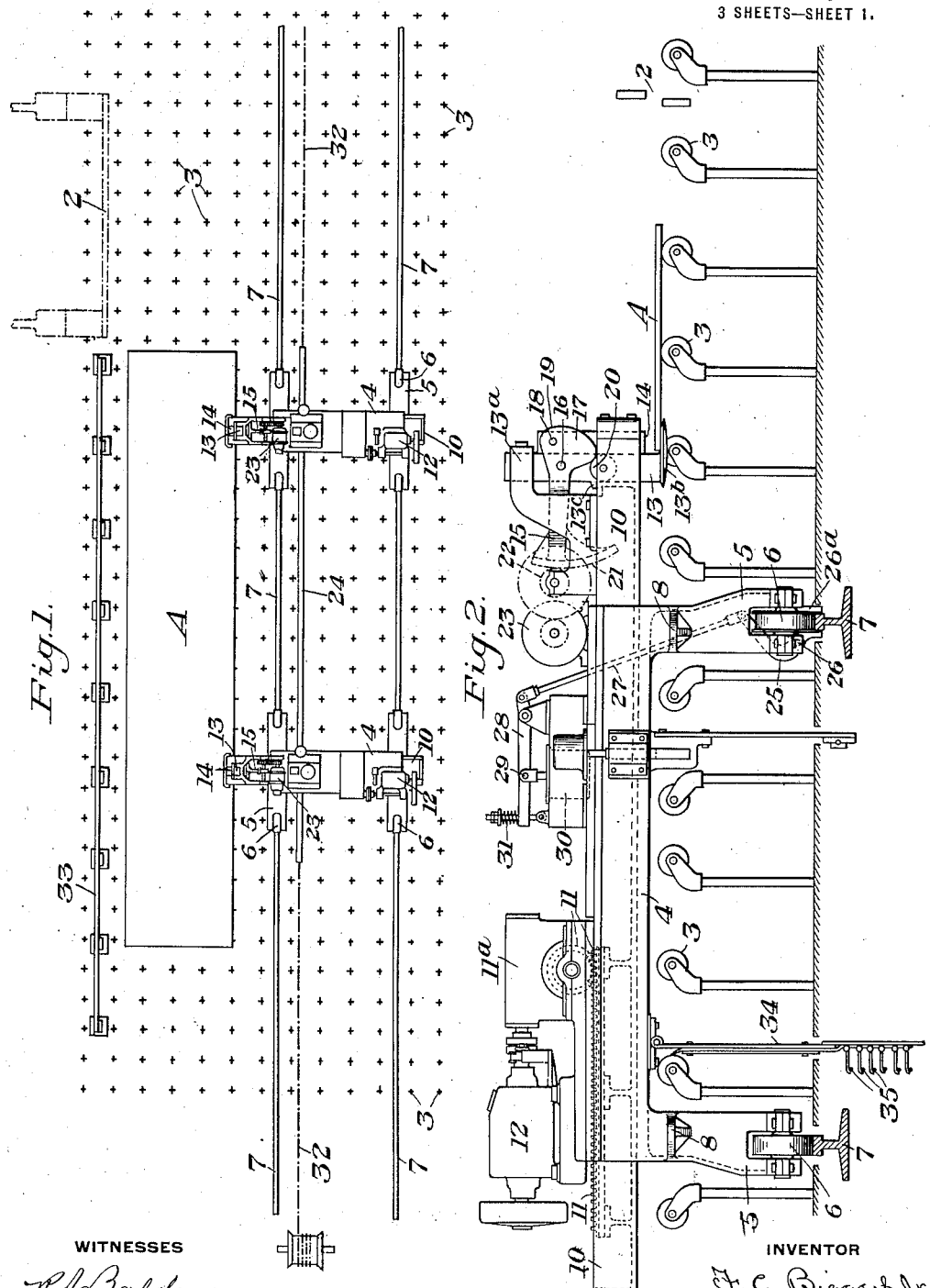

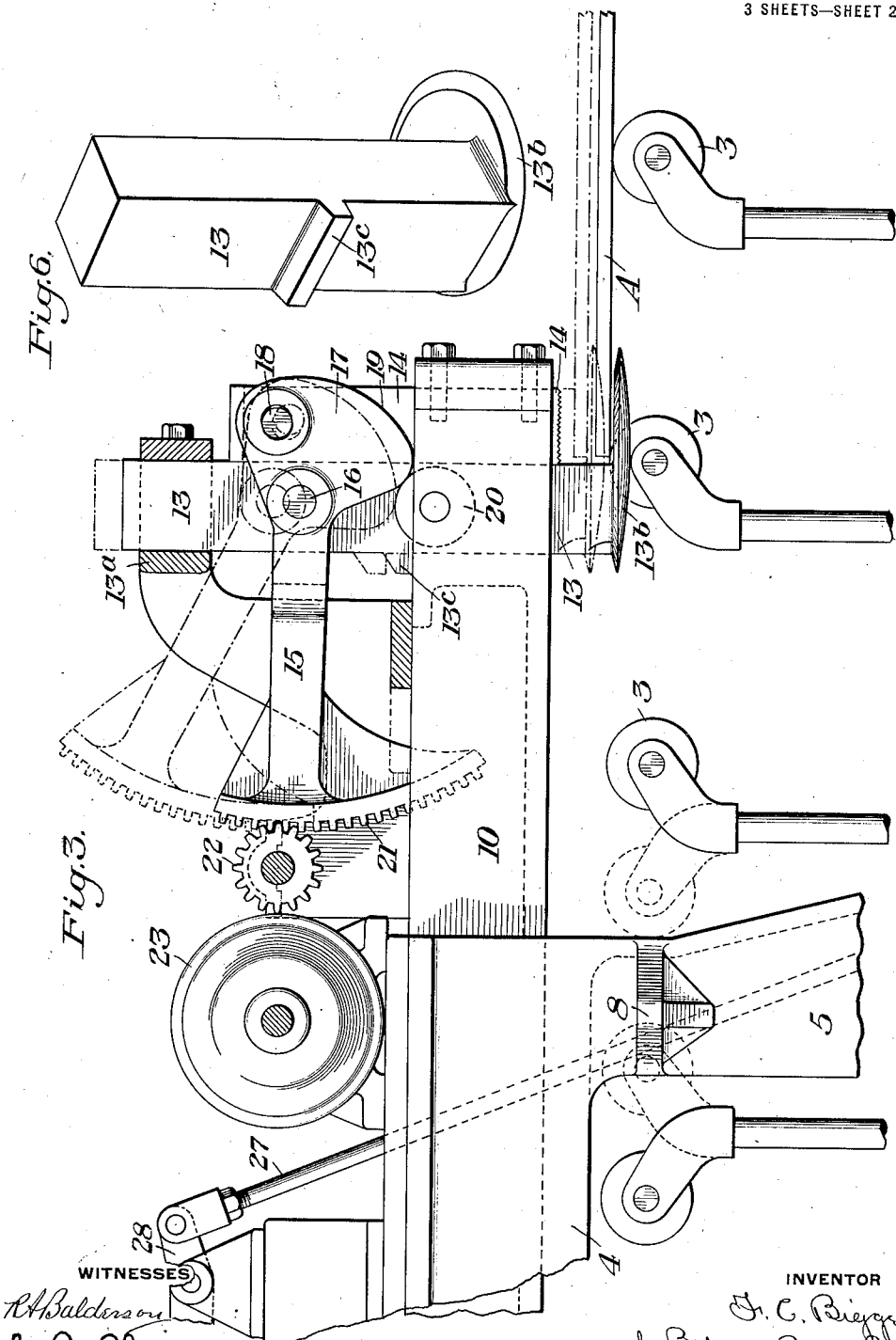

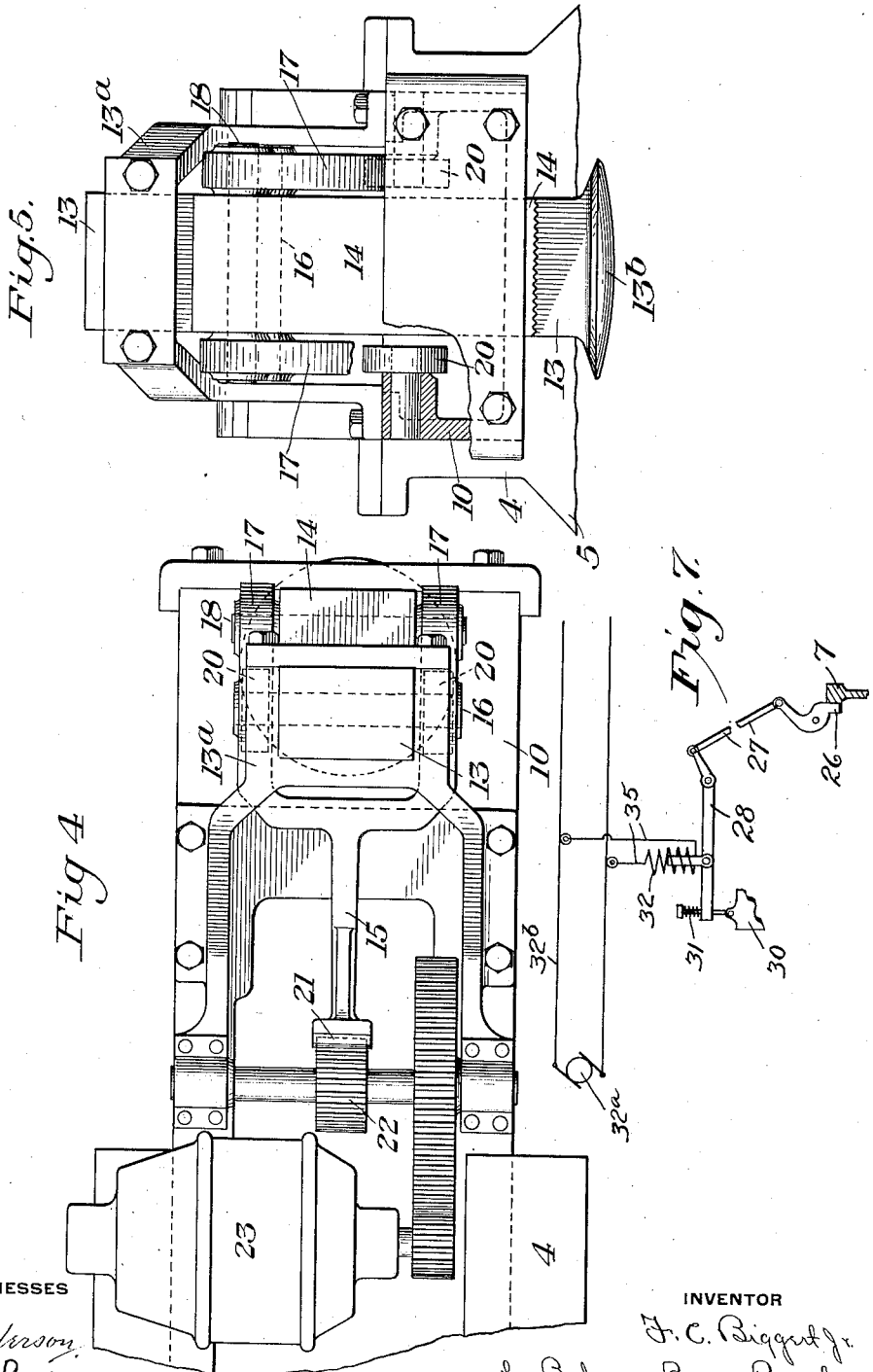

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

MANIPULATOR FOR SHEAR-TABLES.

1,340,595.     Specification of Letters Patent.     Patented May 18, 1920.

Application filed November 2, 1918. Serial No. 260,853.

*To all whom it may concern:*

Be it known that I, FLORENCE C. BIGGERT, Jr., a citizen of the United States, residing at Crafton, in the county of Allegheny and State of Pennsylvania, have invented a new and useful Improvement in Manipulators for Shear-Tables, of which the following is a full, clear, and exact description, reference being had to the accompanying drawings, forming part of this specification, in which—

Figure 1 is a plan view showing my invention applied to a shear table.

Fig. 2 is an end elevation of the same.

Fig. 3 is a sectional elevation on a larger scale showing one of the manipulator elements and its plate gripping device.

Fig. 4 is a plan view of a portion of the apparatus.

Fig. 5 is a view partly in end elevation and partly in section of the apparatus shown in Fig. 4, and Fig. 6 is a perspective view of one of the grip elements.

Fig. 7 is a wiring diagram showing the circuit for the brake solenoid.

My invention has relation to manipulators for shear tables; and more particularly to manipulators for use in connection with the tables of plate shears, but it is also applicable to manipulators for other purposes.

My invention is designed to provide a manipulator by means of which plates of relatively large size may be readily and conveniently located on the table preparatory to shearing, and then moved to the action of the shear. My invention also provides a manipulator of this character which is simple in its construction and mode of operation, and which can be readily controlled by an operator located at any desired point. A further object of my invention is to provide a manipulator which can be readily applied to existing shear tables without change in the latter.

The nature of my invention will be best understood by reference to the accompanying drawings which will now be described, it being premised, however, that various changes can be made in the details of construction, arrangement and combination of the several parts without departing from the spirit and scope of my invention, as defined in the appended claims.

In these drawings the numeral 2 indicates, in a conventional manner, the removable blade of a plate shear. 3 designates swiveled casters of the usual character constituting the shear table. These casters are shown conventionally in Fig. 1 and more in detail in Figs. 2 and 3. They are placed in the usual manner in longitudinal and transverse rows, being swiveled on their supporting posts so that they can readily turn in a horizontal plane.

The complete apparatus comprises two manipulator members which are substantially duplicates of each other. The description of one of these members will apply to both, corresponding reference characters being applied to each. Each of these members consists of a carriage 4 having depending legs 5 carrying wheels 6 arranged to travel upon track rails 7. The legs 5 are of such dimensions as to travel freely between adjacent rows of casters. They are preferably provided with projections 8 which will readily enter between two adjacent casters, and turn them out of the road when the carriage is moved, if they are in an interfering position. Mounted to reciprocate in suitable guides on the truck 4 is a transversely movable manipulator bar 10. This bar can be reciprocated by any suitable means such as the rack and pinion illustrated at 11, the pinion being driven from an electric motor 12 mounted on the carriage 4 to move therewith, through a suitable worm gearing within the housing 11$^a$.

The outer overhanging end of each manipulator bar 10 is provided with a plate gripping device consisting of the coöperating grip or jaw members 13 and 14. The member 13 comprises a vertical bar or post mounted for vertical movement in suitable guides 13$^a$ and having at its lower end a head 13$^b$, the element resembling, in its general form and in the shape of its head, a large railroad spike. The convex shape of the lower surface of the head is such that it will readily ride over the casters as the manipulator is moved.

Said element is provided with a stop projection 13$^c$ for limiting its downward movement. The element 14 is also mounted for vertical movement, its lower end being substantially parallel to the upper surface of the head 13$^b$. 15 designates a lever which is pivoted at 16 to the member 13 and has a cam head portion 17 which has a loose pivotal connection at 18 to the jaw 14. The cam edge 19 of the cam head 17 is designed to bear upon an anti-friction roller 20 mounted on the manipulator bar 10. The opposite end portion of the lever 15 carries a toothed gear segment 21 which meshes with the pinion 22 driven by the electric motor 23.

The two carriages 4 are adjustably connected by a spacing bar 24 upon which they may be adjusted so as to hold them at the desired distance from each other. One leg 5 of each of the carriages is provided with a clamping jaw 25 adapted to engage the head of one of the track rails 7. This jaw is pivoted at 26 and is connected by a link 27 with a lever 28, the latter having a connection at 29 with the plunger of a solenoid magnet 30. It is also provided with a spring 31 which is arranged to act in opposition to the magnet. In the construction shown the clamping jaw is arranged to be normally held in a released position by the action of the solenoid. When the magnet 30 is deenergized the spring 31 moves said jaw into rail clamping position.

The entire manipulator can be moved longitudinally on the track rails 7 by any suitable means such as the endless cable 32, indicated in Fig. 1. 33 designates a straight edge which is placed in line with the cutting edge of the shear blade 2, and by means of which the plate A may be properly lined up preparatory to shearing.

The operation is as follows:

The plate A to be sheared having been placed upon the caster table, the manipulator members 10 are moved forward by the operation of their actuating motors 12 thereby bringing the heads 13$^b$ of the grip members underneath the adjacent edges of the plate, as indicated in Figs. 2 and 3, these heads readily passing over the casters 3. The motors 23 may then be energized, either simultaneously or successively, according to the manner in which it is necessary to manipulate the plate in order to locate properly with the straight edge 33. If one end portion of said plate is to be first moved to the desired position, the corresponding motor 23 is energized, thereby actuating the adjacent lever 15 which is then in the position shown in full lines in Fig. 3. As said lever is moved to the position indicated at dotted lines in Fig. 3, its cam edge 19 contacts with the roller 20 and thereby acts to raise the member 13 and thereby lift a portion of the plate off from the caster rollers sufficiently to permit the lower jaw to clear the casters so that there will be no interference between the jaw and caster when the plate is gripped. Further movement of said lever acts through the pivotal connection at 18 to force the jaw member 14 downwardly and thereby securely grip the plate between its lower end and the head of the member 13. The manipulator bar 10 can then be actuated to move the plate to the desired position. When both sets of grips have been closed in the manner described, it will be apparent that the plate can be shifted bodily as may be desired by actuating the manipulator members 10. When the plate is properly located, the entire manipulator can be moved by the operation of the cable 32 to carry the plate to the action of the shear blade 2. In practice, the coil of the solenoid magnet 30 may be connected in series with the circuit of the motor which actuates the cable 32, so that when the circuit of the motor is broken, the magnet will be simultaneously deenergized, thereby causing the clamping jaw 26 to immediately clamp the adjacent rails 7. This is shown in Fig. 7, in which 32$^a$ designates the cable-actuating motor having the circuit wires 32$^b$ with one of which the trolley contacts 35 engage. The action of this jaw will not only lock the manipulator in position on the track rails during the shearing operation but will also act to square up the manipulator with respect to the cutting edge of the shear blade, due to the fact that the said jaw engages one side of the rail head in the manner shown in Fig. 2, while the other side of such head is engaged by the fixed jaw 26$^a$.

The carriages 4 may be provided with suitable trolleys 34 having contacts 35 for engagement with the necessary electric wires for supplying current to the motor and electro-magnets. I have not illustrated any particular arrangement of circuit controlling devices, since devices of this character are well-known in the art and can be readily supplied by any electrician, so that the operator can control the various circuits at will from his station.

The advantages of my invention will be apparent to those familiar with this art, since it provides a plate manipulator which is simple in its construction and mode of operation; which can be readily applied to existing shear tables; which is capable of readily handling large plates; and which can be readily controlled by the operator. The features of my invention herein shown and described, but not claimed, form the subject matter of my co-pending application, Serial No. 260,852 filed November 2, 1918.

I claim:

1. A manipulator for plates and the like, comprising two coöperating movable jaw members mounted for independent movement toward and away from each other, and actuating connections for mechanically operating said member, said connections having means for first moving one of said members toward the other and to subsequently move the other member toward the first named one, substantially as described.

2. A manipulator for plates and the like, comprising a movable carrier and two coöperating jaw members mounted on said carrier for independent vertical movement, connections for mechanically operating said members, said connections having means for first lifting one of said members and to then lower the other member into clamping relation to the first named member, and means for imparting transfer movements to said carrier, substantially as described.

3. A plate manipulator, comprising a movable manipulator member, a headed jaw mounted for vertical movement thereon, a second jaw also mounted for vertical movement and having a gripping face substantially parallel with the upper head of the face of the first named jaw, and actuating connections arranged to first lift one of the jaws and to then lower the other jaw into clamping relation to the first named jaw, substantially as described.

4. A plate manipulator comprising a movable manipulator member, and a pair of jaws mounted thereon for vertical movement, one of said jaws having a head adapted to pass under and have a lifting engagement with the edge portion of the plate, and the other of said jaws adapted to grip the upper surface of the edge portion of the plate, and actuating connections whereby the first named jaw is first raised and the second named jaw is then moved downwardly to grip the plate, substantially as described.

5. A plate manipulator comprising a movable manipulator member, a pair of vertically slidable gripping jaws carried by said member, a lever pivoted to one of said jaws and having a cam head loosely connected to the other jaw, actuating means for said lever, and a relatively fixed bearing for said cam head, whereby as the lever is moved the jaw to which said lever is pivoted will first be raised, after which the other jaw will be moved downwardly by said lever, substantially as described.

6. A plate manipulator comprising a plurality of transversely movable manipulator members, plate gripping jaws mounted on each of said members, and means for separately actuating said members, substantially as described.

7. A plate manipulator comprising a plurality of transversely movable manipulator members, plate gripping jaws mounted on each of said members, and means for separately actuating said members and also for separately actuating the different jaws, substantially as described.

In testimony whereof I have hereunto set my hand.

FLORENCE C. BIGGERT, Jr.